Dec. 10, 1957 R. L. McINTIRE ET AL 2,815,650
REBOILED ABSORBER OPERATION
Filed July 1, 1955
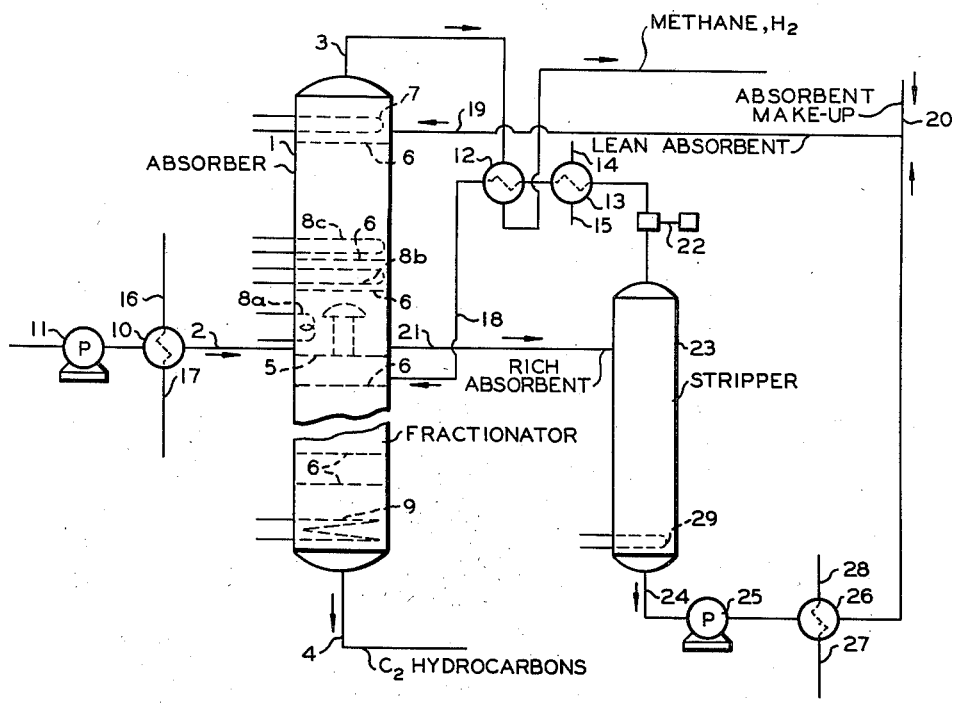
INVENTORS
R.L. MC INTIRE
R.O. SHELTON
BY *Hudson & Young*
ATTORNEYS United States Patent Office
2,815,650
Patented Dec. 10, 1957

2,815,650

REBOILED ABSORBER OPERATION

Robert L. McIntire and Russell O. Shelton, Bartlesville, Okla., assignors to Phillips Petroleum Company, a corporation of Delaware Application July 1, 1955, Serial No. 519,414

7 Claims. (Cl. 62—175.5)

This invention relates to reboiled absorber operation. In one aspect, it relates to reboiled absorber operation for separating at least one low-boiling hydrocarbon from at least one other low-boiling hydrocarbon. In another aspect, it relates to the separation of methane from a mixture including $C_2$ hydrocarbons.

In many separations, the use of reboiled absorbers is found to be the most efficient type of operation for the separation of one or more low-boiling hydrocarbons from at least one other low-boiling hydrocarbon. Such absorbers generally consist of an absorbing section and a stripping section, that is, the feed entry is in approximately the middle of the tower with the section above the feed entry level being the absorbing section and the portion below being the stripping section. A liquid absorbent is added to the top of the absorbing section while the bottom of the stripping section is operated as a reboiler. This method of operation results in an almost constant amount of liquid flowing downward in both sections of the tower. For most efficient operation, we find that the quantity of liquid flowing downward in the absorbing section should be as large as practical and the quantity of liquid flowing downward in the stripping section should be as small as practical.

In general, our invention consists of withdrawing the liquid from a reboiled absorber feed tray, passing the withdrawn liquid to another separator in which absorbed materials are stripped from the liquid absorbent, and the stripped materials after condensation are returned to the reboiled absorber vessel at a level just below the level at which the liquid was withdrawn. In this manner, only a small amount of liquid is treated in the lower section of the reboiled absorber vessel, and furthermore, the heat content of the liquid entering this lower section is easily varied to effect the desired operation.

In our main treating vessel the portion above the feed tray is an absorber and the portion below the feed tray is a fractionator or it can be called a fractionating section.

An object of our invention is to provide a method for the separation of such materials as methane from mixtures containing methane and such other hydrocarbons as ethane, ethylene, acetylene, etc.

Another object of our invention is to provide an efficient method for making such a separation.

Yet another object of our invention is to provide a method for recovering ethylene from cracking still effluents containing ethylene and other hydrocarbons difficult to separate from ethylene.

Yet another object of our invention is to provide a more efficient method for making such a separation involving use of the same or a smaller number of vapor-liquid contacting stages in the separation vessel than are used in the prior art.

Still other objects and advantages will be realized upon reading the following description and attached drawing, which respectively describe and illustrate a preferred embodiment of our invention.

The drawing illustrates in diagrammatic form an assembly of apparatus parts for carrying out the process of our invention.

As an example, we will describe our process employing a cracking furnace effluent containing hydrogen, methane, ethane, acetylene, ethylene, and only very small amounts of $C_3$ and $C_4$ hydrocarbons, as a feed stock. It is to be understood that our process is equally well adapted for the separation of such materials which do not contain free hydrogen. It is also applicable, for example, for separating methane from a mixture of methane, ethane, and other higher boiling hydrocarbons such as would be present in a natural gas. It is also adaptable for the separation of methane from ethane and/or ethylene, for the separation of ethane from ethylene, separation of ethane from mixtures with propylene, propylene from propane, and the like. As mentioned, we will use a cracking furnace effluent material as a charge stock to our process merely as an example.

In the drawing, reference numeral 1 identifies a vapor-liquid contacting vessel which in general is termed a reboiled absorber. A pipe 2 conducts feed stock from a source, not shown, under the influence of a pump 11 through a cooler 10 into about the midpoint vertically of vessel 1. Pipe 2 is intended to discharge the feed stock into said vessel on a liquid separating tray 5, which in one form, sometimes is called a do-nut tray. The portion of vessel 1 above the do-nut tray is herein termed the absorbing section and the portion below the do-nut tray is termed the fractionating section. Disposed within vessel 1 in both the absorbing section and the fractionating section are a number of vapor-liquid contacting elements 6. These vapor-liquid contacting elements are, in some cases, conventional bubble-cap trays, or they can be any other type of vapor-liquid contacting means suitable for the purpose at hand. Disposed on the do-nut tray 5 is a heat exchange means 8a, and on the two trays 6 immediately above the do-nut tray are disposed heat exchange means 8b and 8c. These heat exchangers, as illustrated in the drawing, are closed coils and are adapted to conduct coolants for cooling the absorbing liquid on the several trays. In the upper portion of the absorbing section is a condenser 7 and in the lower portion of the fractionating section is a heating coil 9 for reboiling purposes. A pipe 3, attached to the upper portion of the vessel, conducts the overhead product from the vessel to such disposal as desired. A pipe 4 leading from the bottom of the vessel conducts bottoms product to such disposal as desired. A side stripper vessel 23, which may also be called merely a stripper or stripping vessel, is provided for separation of absorbed material from the absorption oil and the simultaneous production of absorption oil for recycling to the operation. A coil 29 is provided in the lower portion of the stripper 23 for providing reboiling heat to this vessel. A pipe 21 leads rich absorbent from the level of the do-nut tray 5 in vessel 1 to the upper portion of stripper 23 while a pipe 18 leads from the top of stripper 23 to the vessel 1 at a level just below that of the do-nut tray. This latter pipe is intended to conduct stripper overhead from stripper 23 to the fractionating section of the main vessel 1. Because vessel 1 is sometimes operated at a higher pressure than is stripper vessel 23, a compressor or pump 22 is provided for the transfer of overhead material from stripper 23 to vessel 1. A condenser 13 is provided for cooling and at least partially condensing compressed overhead material from stripper 23, and a condenser 12 is provided for further condensing and cooling the partially condensed material from condenser 13. A pipe 24 conducts absorbent free from absorbed materials from the bottom of stripper 23 under the influence of a pump 25 and through a cooler 26, and thence through pipe 19 into the upper portion of the absorber section of vessel 1, A pipe 20 is provided for addition of absorbent to start the operation and for the addition of makeup absorbent, as required. Pipes 17 and 16 are for inlet and outlet, respectively, of coolant to cooler 10, pipes 27 and 28 are for inlet and outlet of coolant to exchanger 26, while pipes 15 and 14 are for inlet and outlet of coolant to condenser 13.

When treating such a feed stock, as hereinbefore mentioned, absorber temperatures are relatively low and the condenser 12 is intended to take advantage of the refrigeration available from the overhead material passing through pipe 3 for at least partially condensing and cooling the stripped material from the top of stripper 23 prior to its entry into the fractionating section of the main vessel 1. Condenser 13 is intended to impart sufficient cooling to the stream from compressor or pump 22 so that the refrigeration available from condenser 12 will condition the feed to the top of the fractionating section in the main vessel to a desired temperature.

When treating the above-mentioned exemplary feed stock at the rate of 100 mols of feed per hour, Table I gives the composition of the several important streams in the process, including the feed stream and the several product streams.

Table I

| Bases | 100 mols/hr. Feed | | | | | |
|---|---|---|---|---|---|---|
| | Feed | Overhead | Bottoms | Absorbent | Side Stream | Stripper Overhead |
| $H_2$ | 32.62 | 32.62 | | | 1.18 | 1.18 |
| $CH_4$ | 7.52 | 7.50 | 0.02 | | 4.72 | 4.72 |
| $C_2H_4$ | 30.61 | 0.77 | 29.84 | | 39.30 | 39.30 |
| $C_2H_2$ | 0.41 | 0.06 | 0.35 | | 0.59 | 0.59 |
| $C_2H_6$ | 27.99 | 0.03 | 27.96 | | 32.05 | 32.05 |
| $C_3+$ | 0.61 | | 0.61 | | 0.59 | 0.59 |
| $C_4+$ | 0.24 | | 0.24 | | 0.24 | 0.24 |
| $C_6$ | | 0.01 | 0.01 | 40.01 | 40.00 | 0.01 |
| | 100.00 | 40.99 | 59.03 | 40.01 | 118.67 | 78.68 |

Makeup absorbent=0.02 mol per 100 mols feed per hour.

While in Table I the absorbent is hexane, any other suitable stable hydrocarbon as propane, butane, pentane, or paraffin higher boiling than hexane, such as heptane, octane, or gasoline, kerosene or such a conventional absorbent as a mineral seal oil can be used as an absorbent in our process. The absorbent must be easily separable in a stripper from absorbed constituents.

In Table II below are given the heat inputs, both positive and negative, and the temperatures in degrees Fahrenheit of the feed and product streams, and the heat input, either added or taken from the process directly or expressed as heat content of process streams.

Table II

| Reference Numeral | Element | +M B. t. u. | −M B. t. u. | Temp., °F. |
|---|---|---|---|---|
| 9 | Fractionator Reboiler | 151.0 | | |
| 2 | Feed | 215.1 | | −55 |
| 7 | Condenser | | 73.4 | |
| 18 minus 21 | Stripper-assembly | | 225.1 | |
| 21 | Side Stream | | | −36 |
| 18 | Stripper Overhead | | | −20 |
| 8a | Cooler | | 30.0 | |
| 8b | Cooler | | 45.0 | |
| 8c | Cooler | | 15.0 | |
| 19 | Lean Absorbent | 219.0 | | −25 |
| 3 | Absorber Overhead | | 45.6 | −56 |
| 4 | Fractionator Bottoms | | 151.0 | +23.5 |
| 24 | Stripper Bottoms | | | +390 |

As a comparison illustrating an advantage of our process over that of the prior art in which the absorption oil added to the absorber section of a reboiled absorber vessel flows all the way downward through the absorbing section and through the conventional attached stripping section, the absorber and stripper being operated at 400 pounds per square inch absolute. The overhead product from our process flowing through pipe 3 contains 0.77 mol of ethylene per 100 mols of feed stock while in the conventional operation, the corresponding product contains 0.98 mol of ethylene per 100 mols of feed, thereby making an advantage of 0.21 mol of ethylene saved per 100 mols of feed. In this comparison, the feed composition and temperature, pressures, absorbent rates, overhead temperatures are the same. While this amount of ethylene (0.21 mol) retained in the kettle product in our improved operation may not appear especially large, yet when considered from the point of view that many hundreds or even thousands of mols of feed stock are treated per day, for example, in an ethylene production plant, this advantage would result in a substantial increase in the amount of ethylene produced. From Table II it will be noted that the hydrocarbon stream flowing through pipe 4 is at a temperature of 23.5° F. in comparison to a bottoms temperature of 94° F. in a conventional operation. Available refrigeration of 151,000 B. t. u. per hour at 23.5° F. is a valuable asset. The above-mentioned saving in ethylene, of course, is realized by including the 0.21 mol of ethylene per 100 mols of feed in the bottoms product in pipe 4 of the fractionator. This amount of ethylene is prevented from passing overhead with the dry gas which will ordinarily pass to pipe line or to plant fuel, etc.

Among the advantages which our process has over known processes may be listed, (1) a lower temperature is required in the reboiler and this lower temperature makes available the bottoms product from the fractionator section at a relatively low temperature and such a bottoms product is useful as a coolant for heat exchange steps; (2) the reboiler closed coil heating medium removed from the coil is available for other heat exchange service at a lower temperature (for refrigeration) than the corresponding heating medium in prior art processes; (3) a better ethylene separation is obtained, i. e., more ethylene from the feed stock is saved upon increase of the ethylene content of the $C_2$ product stream, and conversely, less ethylene is lost in the dry gas overhead product; and (4) interheating and intercooling are easily obtained by control of the temperature of the stream of condensed hydrocarbon from the top of the side stripper for control of the fractionating operation in the fractionating section of the main vessel.

In the operation herein described, it is intended that all of the absorption oil and absorbed material be withdrawn from the do-nut tray as the side stream to the side stripper 23. Since none of the absorption oil flows downward in the fractionating section of the main vessel, it is obvious that one of the main advantages of our process is accomplished in that a large volume of liquid is flowing downward in the absorbing section of the vessel while only a relatively small quantity of liquid is flowing downward in the fractionating section, and this type of operation assists markedly in obtaining our improved results. All of the absorption oil flowing downward in the absorbing section is recovered as lean absorbent in stripper 23, cooler 26 imparting sufficient cooling to the lean oil for its reintroduction at the proper temperature through pipe 19 into the absorbing section of vessel 1.

It is further noted that all of the vapors from the fractionation zone of the main vessel pass upward through the absorbing section for improved recovery of the $C_2$ hydrocarbons.

The above operating temperatures and pressures, absorption oil flow rate, etc., are given merely as an example of one favorable set of conditions under which to operate our process. It will be realized by those skilled in this art that temperatures, pressures, feed rate, absorption oil rate, etc. will need to be varied somewhat from those conditions given as the feed composition changes. For example, the absorber pressure can be 425 p. s. i. a., the stripper pressure 325 p. s. i. a. and the corresponding temperatures will, of course, be somewhat higher than those given when operating the absorber and stripper at 400 p. s. i. a. and 300 p. s. i. a., respectively.

It might be mentioned that while the drawing illustrates our fractionator and absorber being disposed in the same vessel, it is within the scope of our operation to construct these units separately.

While the above flow diagram has been described for illustrative purposes, the invention obviously is not limited thereto.

We claim:

1. A process for carrying out a demethanizing operation comprising introducing a vaporous feed stock comprising methane and at least one $C_2$ hydrocarbon into an absorption zone and therein contacting said feed stock with a lean absorption oil, withdrawing the absorption oil containing absorbed $C_2$ hydrocarbon from said absorption zone, stripping absorbed hydrocarbon from the withdrawn absorption oil, introducing the absorption oil deleted of absorbed hydrocarbon from the stripping operation into said absorption zone as said lean absorption oil, condensing a portion of the stripped hydrocarbon, introducing condensate so produced and the uncondensed stripped hydrocarbon into a fractionating zone, said condensate serving as reflux for said fractionating zone, adding sufficient reboiling heat to said fractionating zone to reboil material therein, passing vapor from said fractionating zone into said absorption zone and therein also contacting this latter uncondensed stripped hydrocarbon with the first mentioned lean absorption oil and withdrawing unabsorbed gas comprising methane from said absorption zone as one product and withdrawing reboiled material comprising said $C_2$ hydrocarbon from said fractionating zone as a second product of the process.

2. The process of claim 1 wherein said feed stock is a cracked hydrocarbon stock comprising $H_2$, methane, ethane, ethylene and higher boiling hydrocarbons, said overhead product comprises $H_2$ and methane and said kettle product comprises ethane, ethylene and said higher boiling hydrocarbons.

3. A process for separating a first low-boiling hydrocarbon from a second low-boiling hydrocarbon boiling at a higher temperature than said first low-boiling hydrocarbon comprising introducing a feed stock comprising said low-boiling hydrocarbons into an absorption zone and therein contacting said feed stock with a lean absorption oil, withdrawing the absorption oil rich in absorbed said second low-boiling hydrocarbon from said absorption zone, stripping absorbed hydrocarbon from the withdrawn absorption oil, introducing the absorption oil deleted of absorbed hydrocarbon from the stripping operation into said absorption zone as said lean absorption oil, condensing a portion of the stripped vapors, introducing condensate so produced and the uncondensed stripped vapors into a fractionating zone, said condensate serving as reflux for said fractionating zone, adding sufficient reboiling heat to said fractionating zone to reboil material therein, passing vapor from said fractioning zone into said absorption zone and therein contacting said vapor introduced thereinto with the first mentioned lean absorption oil, withdrawing unabsorbed first low-boiling hydrocarbon from said absorption zone as one product and withdrawing reboiled material comprising said second low-boiling hydrocarbon from said fractionating zone as a second product of the process.

4. A process for carrying out a demethanizing operation comprising introducing a feed stock comprising methane and at least one $C_2$ hydrocarbon into an absorption zone, introducing a lean absorption oil into said zone, maintaining said absorption zone under superatmospheric pressure absorption conditions and therein countercurrently contacting said lean absorption oil and said feed stock wherein at least a portion of said $C_2$ hydrocarbon dissolves in said absorption oil, withdrawing the contacted absorption oil enriched in said $C_2$ hydrocarbon from the absorption zone, stripping absorbed $C_2$ hydrocarbon from the withdrawn absorption oil, cooling the absorption oil stripped of $C_2$ hydrocarbon and introducing this cooled oil into said absorption zone as said lean absorption oil, condensing at least a portion of the stripped vapors from said stripping zone, introducing the condensate and the uncondensed portion of the stripped vapors into a fractional distillation zone, said condensate being liquid reflux for said fractional distillation zone, withdrawing overhead vapors from said fractional distillation zone and passing these vapors into said absorption zone and therein contacting said vapors with the first mentioned lean absorption oil, maintaining said fractional distillation zone under superatmospheric pressure, and under fractional distillation conditions by adding sufficient reboiling heat thereto to promote reboiling thereof, withdrawing overhead product comprising methane from said absorption zone and withdrawing reboiled material comprising said $C_2$ hydrocarbon from said fractional distillation zone as separate products of the process.

5. The process of claim 4 wherein said feed stock is a cracked hydrocarbon stock comprising $H_2$, methane, ethane, ethylene and higher boiling hydrocarbons, said overhead product comprises $H_2$ and methane and said kettle product comprises ethane, ethylene and said higher boiling hydrocarbons.

6. In the process of claim 4, maintaining the absorption zone under absorption conditions by maintaining a superatmospheric pressure therein, and cooling the absorption oil therein by indirect heat exchange with a coolant.

7. In the process of claim 4, maintaining a pressure of about 400 pounds per square inch absolute in said absorption zone and a pressure of about 300 pounds per square inch absolute in the stripping operation.

References Cited in the file of this patent
UNITED STATES PATENTS

| | | |
|---|---|---|
| 2,486,543 | Wenzke | Nov. 1, 1949 |
| 2,603,301 | Gilmore | July 15, 1952 |
| 2,661,812 | Gilmore | Dec. 8, 1953 |